United States Patent Office.

ALVIN DAVIS PUFFER, OF BOSTON, MASSACHUSETTS.

Letters Patent No. 111,568, dated February 7, 1871.

IMPROVEMENT IN WINE-SIRUPS AND BEVERAGES.

The Schedule referred to in these Letters Patent and making part of the same.

*To all to whom these presents shall come:*

Be it known that I, ALVIN DAVIS PUFFER, of Boston, in the county of Suffolk and State of Massachusetts, have made an invention of certain new and desirable Wine-Sirups and Beverages; and do hereby declare the following to be a full, clear, and exact description thereof, sufficiently lucid to enable others practiced in the art to which it relates to compound and use the same.

The purpose of this invention is to produce sparkling or aerated beverages, which, being more than mere imitations of wines or beers, are in certain respects preferable to them, and which constitute a healthful and delicious drink, that may be drawn from ordinary soda-fountains, or from bottles filled and charged after the manner of mineral-waters, so called.

The object of this invention is to provide sparkling or aerated wine beverages that may be drawn from soda-water fountains as in the ordinary way of drawing soda-water sirups.

I have found that certain wines may be concentrated into sirups, which, when drawn from sirup-chambers of soda-water fountains and mixed with the aerated water, yield beverages having all the characteristics of wines; and also, that sirups may be manufactured which, when drawn with soda-water, make beverages having the strength, flavor, and medicinal qualities of wines.

I am aware that wines, like claret, for instance, have been mixed with soda-water and syrups, but the drink prepared in this way is simply flavored with wine, and is very much diluted, and entirely different from that obtained by the use of my concentrated sirups, being deficient in alcoholic strength and flavor, and quality of fruit extract.

The wines that I prefer to make are generally of the effervescing kinds, like champagne, sparkling hock, and others; but I do not confine myself to these, as the flavors of many still wines may be closely imitated, although soda-water causes them to effervesce at the time of drawing.

To enable others to make use of my invention, I will give one method of procedure by which I have successfully made and imitated champagne-wine.

By chemical analysis, good imported champagne has been found to retain twelve per cent. of absolute alcohol, and about one and one-eighth pound of fruit-extract and saccharine matter in a gallon of wine. Now, as it is customary to draw soda-water tumblers or mugs about one-sixth full of sirup before introducing the aerated water, I find it necessary to concentrate my wine-sirups into one-sixth part of the volume of wine that is to be drawn. I therefore make my champagne-sirup of about six and three-quarters pounds of fruit-extract and sugar, with about three quarts of alcohol and one quart of water, flavoring with essential oils or coloring it with a little caromel, when desirable.

For fruit extracts I use jellies of grapes, apples, currants, and other fruits, with sugar, and sometimes a little gelatine, and I use the pure ninety-five per cent. alcohol of commerce in making these sirups.

I do not wish to confine myself to any exact proportions of ingredients, nor to the kinds of fruit-extracts and flavoring used, as these will readily suggest themselves to a person accustomed to compounding sirups for soda-water, especially after a few experimental trials; but it is important that the sirups should contain nearly six times as much alcohol as the wine or wine beverage is intended to contain.

Good fruit extracts, with some flavor, may be procured by boiling down wines, in a vacuum or otherwise, to the proper consistency, and these, mixed with alcohol, with or without additional flavoring, make my sirups, and yield pleasant wine beverages with soda-water; but such sirups are generally more costly than those made of jellies and sugar.

It will be apparent that, by making sirups of concentrated malt and hop extracts, with the necessary quantity of alcohol added, and drawing them with soda-water, I can make pleasant effervescing beverages, like ale or beer, one great advantage being that such sirups may be kept for a long time without undergoing change or decomposition.

My invention therefore consists in the manufacture or compounding of concentrated wine and malt sirups, which, when drawn with soda-water, make pleasant beverages, like wines, ales, or beers, but very much cheaper, such sirups and beverages being new and desirable articles of manufacture.

*Claims.*

1. Concentrated wine or beer-sirups, made as herein described, or in any way substantially the same, when used for the purposes set forth.

2. Wine or beer beverages, made by mixing soda-water with the above-described sirups.

ALVIN DAVIS PUFFER.

Witnesses:
FRED. CURTIS,
EDWARD GRIFFITH.